(12) United States Patent
Rosenstock et al.

(10) Patent No.: US 7,087,917 B2
(45) Date of Patent: Aug. 8, 2006

(54) APPARATUS AND PROCESS FOR RETRIEVING INFORMATION PROJECTED IMAGE-WISE ON A REUSABLE STORAGE FILM

(75) Inventors: Yehuda Rosenstock, Freeport, NY (US); Edgar Alzner, Garden City, NY (US)

(73) Assignee: Air Techniques, Inc., Hicksville, NY (US)

( * ) Notice: Subject to any disclaimer, the term of this patent is extended or adjusted under 35 U.S.C. 154(b) by 0 days.

(21) Appl. No.: 11/019,078

(22) Filed: Dec. 22, 2004

(65) Prior Publication Data

US 2006/0131523 A1  Jun. 22, 2006

(51) Int. Cl.
*G01N 23/04* (2006.01)
(52) U.S. Cl. .................................... 250/584
(58) Field of Classification Search ............. 250/584
See application file for complete search history.

(56) References Cited

U.S. PATENT DOCUMENTS 6,466,352 B1 * 10/2002 Shahar et al. .............. 359/212
6,599,014 B1 * 7/2003 Thoms ....................... 378/184
2005/0040353 A1 * 2/2005 Alzner et al. ............... 250/584

* cited by examiner

*Primary Examiner*—David Porta
*Assistant Examiner*—Marcus Taningco
(74) *Attorney, Agent, or Firm*—Clifford G. Frayne; Louis E. Marn

(57) ABSTRACT

These and other objects of the present invention are achieved by an apparatus and process for evaluating an image-wise exposed storage film positioned about a cylindrically-shaped member and linearly passed a cylindrically-shaped slot for interrogation by a light beam wherein a processing assembly is co-axially disposed within a processing chamber formed by the cylindrically-shaped member and wherein the processing assembly includes a plate member disposed for rotation in a plane perpendicular to the axis of the processing chamber and having a pentaprism and a fluorescence light sensor positioned proximate the contact point of the interrogating light beam with the storage film and further including converting electronics for thus generated fluorescence light.

2 Claims, 5 Drawing Sheets

APPARATUS AND PROCESS FOR RETRIEVING INFORMATION PROJECTED IMAGE-WISE ON A REUSABLE STORAGE FILM

BACKGROUND OF THE INVENTION

The Invention

These and other objects of the present invention are achieved by an apparatus and process for evaluating an image-wise exposed storage film positioned about a cylindrically-shaped member and linearly passed a cylindrically-shaped slot for interrogation by a light beam wherein a processing assembly is co-axially disposed within a processing chamber formed by the cylindrically-shaped member and wherein the processing assembly includes a plate member disposed for rotation in a plane perpendicular to the axis of the processing chamber and having a pentaprism and a fluorescence light sensor positioned proximate a contact point of the interrogating light beam with the storage film and further including converting electronics for the thus generated fluorescence light.

Description of the Prior Art

Traditional x-ray imaging systems using silver-based films are being replaced by radiographic imaging systems using photo-stimulable phosphor imaging films or substrates eliminating the need for physical storage of the imaged film since digital retrieval of the image information includes input and computer storage permitting viewing of such information on a viewer, such as CRT tube assembly. Additionally, such computer stored image information permits facile electronic transmission to any preselect location obviating physical transfer of the thus formed image on the imaging film.

In U.S. Pat. No. 5,874,744 to Goodman, et al., assigned to the same assignee as the present invention, there is disclosed a process and apparatus for processing radiographic information from an anisotropic storage phosphor screen including an opto-electro-mechanical assembly to achieve faster scan of an interrogating beam and including detector and computer assembly, herein incorporated by reference.

In U.S. Pat. No. 6,599,004 to Thoms, there is disclosed an assembly for reading flexible storage films wherein the flexible storage film having image-wise projected information is positioned on a cylindrically-shaped surface and is caused to be linearly moved there over while being interrogated or scanned via a slot by a light beam generated in a helical line in a continuous manner from a point disposed at the axis of the cylindrically-shaped surface. The output fluorescence light or signal generated at the actual point the light beam intersects the storage film is received by a large diameter photomultiplier disposed proximate the slot. Such output signal is recorded together with positioning encorders to obtain an electrical image of the thus stored x-ray image on the storage foil. The configuration of the photomultiplier and the distance therefrom to the interpreting electronics results in a signal/noise ratio which while acceptable if advantageously decreased would provide more efficacious end result.

As used herein, the term "reusable storage film" is a flexible substrate formed with a layer of a photo-stimulable phosphors which is capable of imaging with ionizing radiation or x-rays which after imaging may be interrogated or scanned with a source of light energy to produce photo-stimulated luminescence information capable of being digitally read and stored.

OBJECTS OF THE INVENTION

An object of the present invention is to provide an improved apparatus and process for interrogating and interpreting an image on a reusable storage film moving past an accessible slot of an interrogating light beam.

Another object of the present invention is to provide an improved apparatus and process for interrogating and interpreting an image on a reusable storage film moving past an accessible slot of an interrogating light beam of improved signal and noise ratio.

Yet another object of the present invention is to provide an improved apparatus and process for in interrogating and interpreting an image on a reusable storage film moving past an accessible slot of an interrogating light beam to provide more efficacious replication of the resulting image.

A still further object of the present invention is to provide an improved apparatus and process for interrogating and interpreting an image on a reusable storage film moving past an accessible slot of an interrogating light beam of reduced spatial distance between sensed generated fluorescent light and interpreting electronics.

SUMMARY OF THE INVENTION

These and other objects of the present invention are achieved by an apparatus and process for evaluating an image-wise exposed storage film positioned about a cylindrically-shaped member and linearly passed a cylindrically-shaped slot for interrogation by a light beam wherein a processing assembly is co-axially disposed within a processing chamber formed by the cylindrically-shaped member and wherein the processing assembly includes a plate member disposed for rotation in a plane perpendicular to the axis of the processing chamber and having a pentaprism and a fluorescence light sensor positioned proximate a contact point of the interrogating light beam with the storage film and further including converting electronics for the thus generated fluorescence light.

BRIEF DESCRIPTION OF THE DRAWINGS

Further objects and advantages of the present invention will become more readily apparent by reference to the following detailed description thereof when taken with the accompanying drawings wherein like numerals designate like parts throughout and wherein.

DETAILED DESCRIPTION OF THE INVENTION

Figure 1:
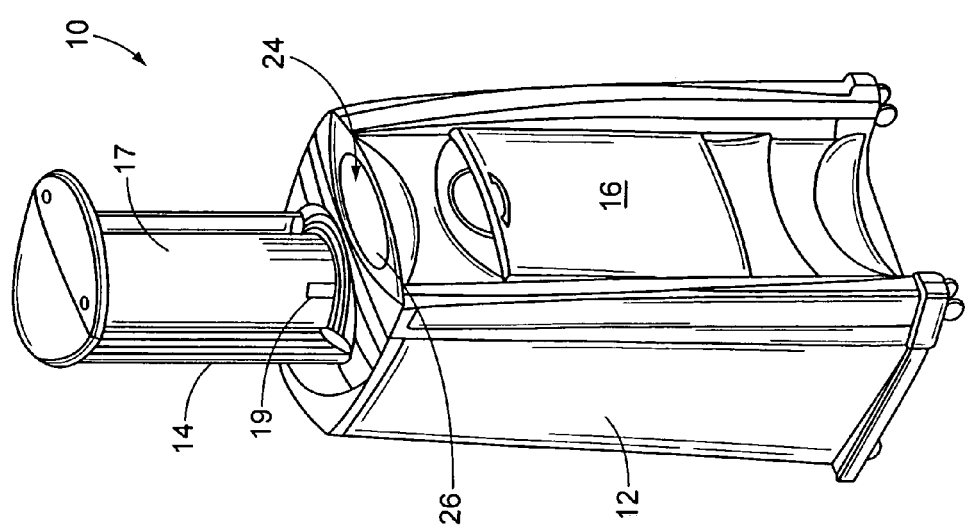
FIG. 1 is an isometric view of an assembly including the processing assembly of the present invention.

Referring now to the drawings and particularly FIG. 1, there is illustrated a reading and restoration assembly for reusable storage films, generally indicated as 10, comprised of lower housing or base portion, generally indicated as 12, on which is mounted a scanning assembly, generally indicated as 14. The lower housing portion 12 is comprised of a vertically-mounted front door member 16.

Figure 2:
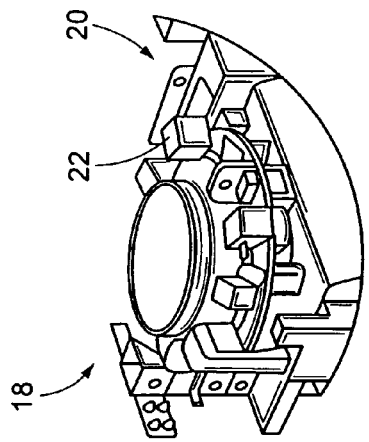
FIG. 2 is a partial enlarged view of the positioning and transportation assembly of the assembly of FIG. 1.

The upper scanning assembly 14 is comprised of a cylindrically-shaped support surface 17 for positioning an imaged storage film 19 thereabout and encloses a photomultiplier assembly, generally indicated as 18, referring to FIG. 2. Disposed below the photomultiplier assembly 18, there is provided a transportation assembly generally indicated as 20 including a plurality of roller and belt member assembly 22 for passing an imaged storage film downwardly passed a cylindrically-shaped slot (not shown) as described in the aforementioned USP '914 to Thoms, herein incorporated by reference, for interrogation or scanning by a focusing beam of photons, i.e. light to digitally generate photo-stimulated luminescence to be measured and stored in an appropriate computer assembly, such as described in the aforementioned patent to Goodman, et al.

The assembly 10 is provided with a control panel, generally indicated as 24, including a control member 26 for initiating operation of the assembly 10 under the control of a CPU unit prior to positioning of an imaged storage film on the supporting surface. Such CPU unit includes programs to process the projected imaged storage film during passage through the assembly 10 and includes indicator lights providing status information on the storage film being processed through completion of the restoration process.

Figure 3:
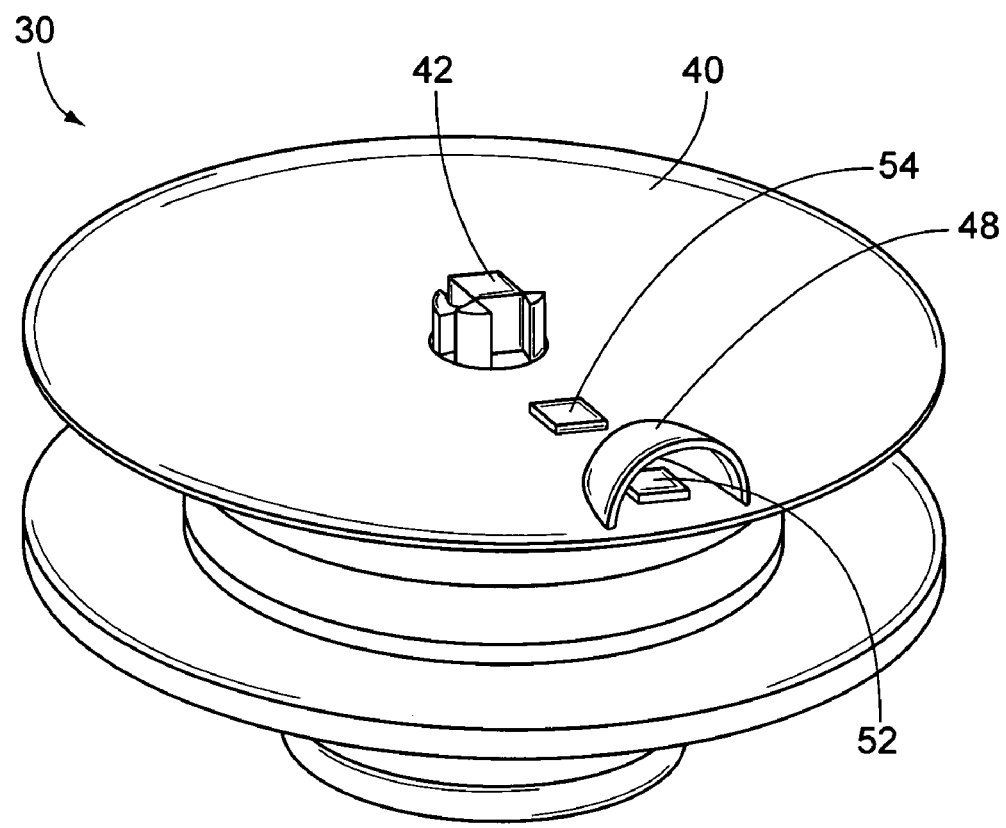
FIG. 3 is an isometric view of the processing assembly of one embodiment of the present invention.
Figure 4:
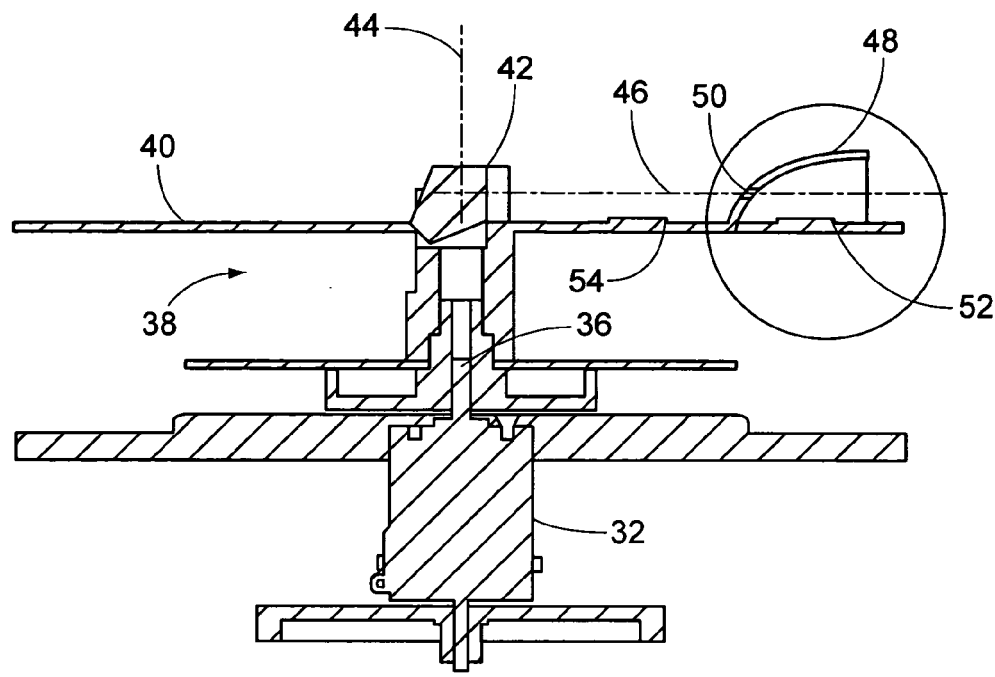
FIG. 4 is a cross sectional side view of the processing assembly of FIG. 3.
Figure 5:
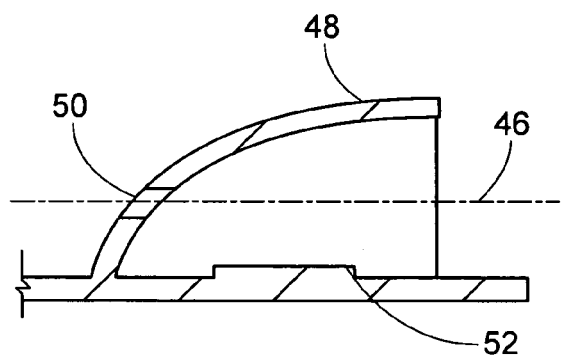
FIG. 5 is an enlarged cross-section side view of section "A" of FIG. 4.

The photomultiplier assembly 18 includes a processing assembly, generally indicated as 30, referring now to FIGS. 3 to 5, illustrating one embodiment of the present invention. The processing assembly 30 includes a motor 32 mounted to a support plate member 34 and having a shaft 36 co-axially disposed within the photomultiplier 18. A support assembly, generally indicated as 38, is mounted on the shaft 36 and includes a disk-shaped plate member 40 mounted for rotation in a plane perpendicularly disposed to the sign axis of the photomultiplier assembly 18.

Positioned in the plate member 40 in co-axial alignment with the shaft 36 is a pentaprism 42 for directing light beams 44, such as produced by a laser, to a light beam 46 oriented in a plane perpendicular to the axis and in parallel relationship to the plate member 40 and in the plane of the slot (not shown) of the photomultiplier assembly 18, as hereinabove discussed. Along a vertical plane defined by the light beam 46, there is co-axially positioned near the outer edge thereof, a parabolically-shaped reflector member 48 including an orifice 50 for the light beam 44. Mounted on the plate member 40 along the axis of the parabolically-shaped reflector member 48 is a light sensor member 52 connected to an electronic converter member 54 positioned on the plate member 40 for processing the thus generated stimulated fluorescent light.

Figure 6:
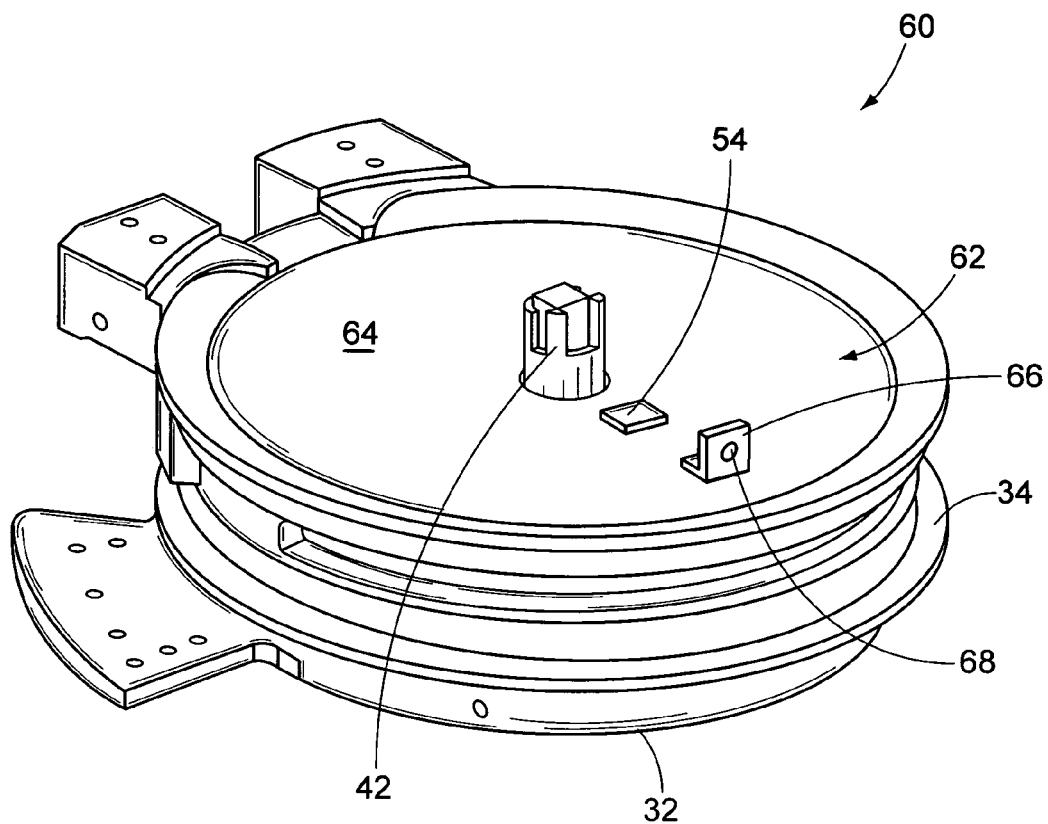
FIG. 6 is an isometric view of a processing assembly of another embodiment of the present invention.
Figure 7:
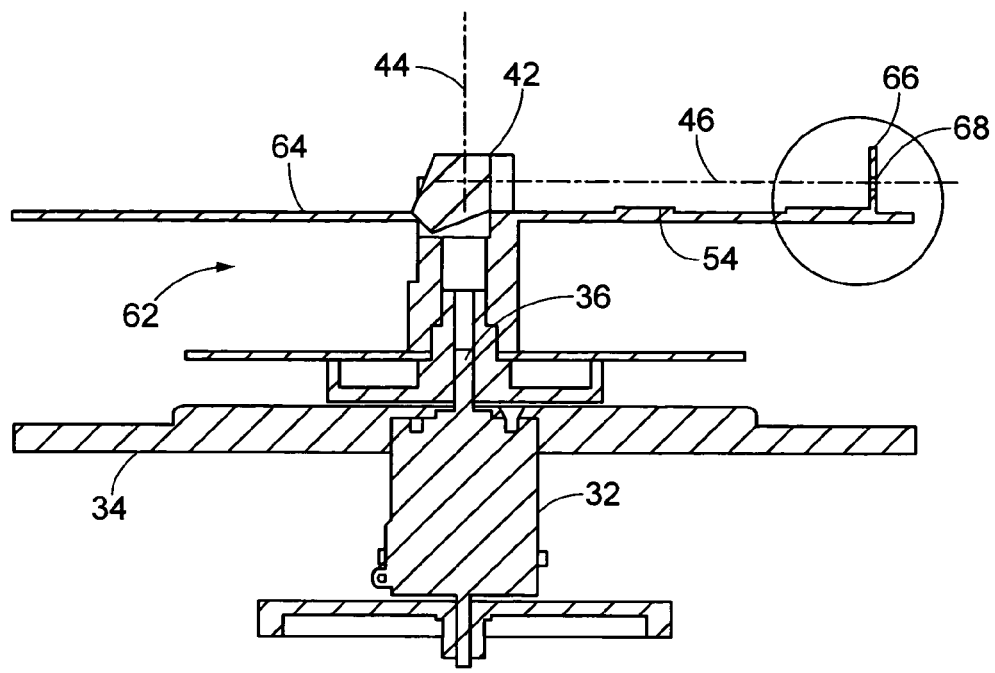
FIG. 7 is a cross-sectional side view of the processing assembly of FIG. 6.
Figure 8:
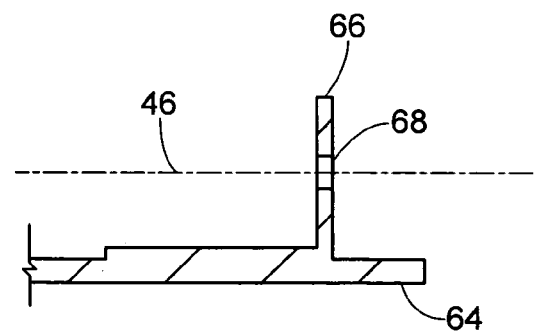
FIG. 8 is an enlarged cross-sectional side view of section "B" of FIG. 7.

FIGS. 6 to 8 illustrate another embodiment of the processing assembly, generally indicated as 60, of the present invention. The processing assembly 60 includes a motor 32 mounted to a support plate member 34 and having a shaft 36 co-axially disposed within the photomultiplier 18. A support assembly, generally indicated as 62, is mounted on the shaft 36 and includes a disk-shaped plate member 64 mounted for rotation in a plane perpendicularly to the axis of the photomultiplier assembly 18.

Positioned in the plate member 64 in co-axial alignment with the shaft 36 is a pentaprism 42 for directing a light beam 44, such as produced by a laser, to a light beam 46 oriented in a plane perpendicular to the axis and in parallel relationship to the plate member 38 in the plane of the slot (not shown) of the photomultiplier assembly 18 as hereinabove discussed. Along a vertical plane defined by the light beam 46 and perpendicularly disposed to the plate member 38, there is co-axially positioned near the outer edge thereof, a perpendicularly disposed light sensor 66 including an orifice 68 for the light beam 44. Mounted on the plate member 38 and connected to the light sensor 66 is an electronic converter member 54 for processing the thus generated stimulated fluorescent light.

In operation, the assembly 10 is activated and an imaged storage film (not shown) is positioned about the cylindrically-shaped support surface 16 and is sensed to cause activation of the transportation assembly 20 whereby the roller and belt assemblies 22 are caused to rotate in a manner to effect downwardly displacement of the image storage film about the support surface 16. Simultaneously, the processing assembly 30 referring to FIGS. 3 to 5, is activated thereby causing the plate member 38 to rotate and the light beam 44 to be directed towards the pentaprism 42 and therein redirected to light beam 46 in a plane perpendicular thereto and through the orifice 50 of the parabolic reflector 48 onto the image storage film being linearly advanced past the slot. The light beam 46 is caused to interrogate and generate photo-stimulated luminescent light which is collected and focused by the parabolic-shaped reflector 48 onto the light sensor 52 and digitally received and interpreted by the computer member 54 and stored such as disclosed with the aforementioned patent to Goodman, et al.

Use of the processing assembly 60, as illustrated in FIGS. 6 to 8, is similar to that of FIGS. 3 to 5 except that the positioning of the light sensor 66 is in a plane essentially parallel to the image storage film being processed. In both instances, the light sensor is positioned close to the source of the generated fluorescent light to reduce signal/noise ratio and thereby substantially improve the perused image information.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. An apparatus for retrieving information stored image-wise on a storage film which comprises:
    a cylindrically-shaped positioning surface for said storage film; and
    means for scanning said image projected on said reusable storage film and concomitantly collecting light generated during scanning wherein said scanning and collecting means is a processing assembly comprised of a rotating plate member having a pentaprism and a light sensor positioned in axial alignment with a light beam directed by said pentaprism onto said storage film, said light sensor positioned proximate said light generator; and
    means for transporting said reusable storage film through said scanning means.

2. A process for retrieving information stored image-wise on a reusable storage film, which comprises:
    transporting an image-wise containing reusable storage film through a scanning zone;
    rotating a plate member having a pentaprism and a light sensor positioned in axial alignment with a light beam directed by said pentaprism onto said storage film, said light sensor positioned proximate said light generator;

interrogating said storage film with a light to digitally generated photo-stimulated luminescent light; and collecting said digitally thus generated photo-stimulated luminescent light proximate said scanning zone.

* * * * *